United States Patent [19]

Baughman

[11] Patent Number: 4,463,931

[45] Date of Patent: Aug. 7, 1984

[54] DAMPER DEVICE AND METHOD OF FORMING

[75] Inventor: Walter P. Baughman, Livonia, Mich.

[73] Assignee: Plastomer Corporation, Livonia, Mich.

[21] Appl. No.: 299,782

[22] Filed: Sep. 8, 1981

[51] Int. Cl.³ .............................................. F16K 1/22
[52] U.S. Cl. ......................................... 251/298; 98/2
[58] Field of Search .................... 98/2, 2.08; 251/298, 251/228; 24/96, 214, 292, 295, 297

[56] References Cited

U.S. PATENT DOCUMENTS

| | | | |
|---|---|---|---|
| 1,082,174 | 12/1913 | Rutherford | 137/519 |
| 2,804,008 | 8/1957 | Koch | 98/118 |
| 3,027,097 | 3/1962 | Gleason et al. | 251/298 X |
| 3,889,320 | 6/1975 | Koscik | 24/297 |
| 4,267,880 | 5/1981 | Jacquet | 98/2.08 X |

FOREIGN PATENT DOCUMENTS 2333180  6/1977  France ................................ 251/298

Primary Examiner—Harold Joyce
Attorney, Agent, or Firm—Barnes, Kisselle, Raisch, Choate, Whittemore & Hulbert

[57] ABSTRACT

A damper or door plate construction and mount which is adapted to in situ assembly including a core plate of sheet plastic, a thin covering of porous foam material on each side, and a mounting shaft on a pivoting axis for the damper. The mounting shaft is secured at each end within the confines of the plate by tabs cut from the core plate and formed to provide a retaining recess for the shaft. The shaft has a loop between the ends forming a bight on the plane of the damper plate. A retaining member has a head and shank which fits the bight of the shaft and locks it against movement longitudinally, laterally, or away from the plate. The retaining member is held to the plate by a snap-in projection. A method of forming multiple plates from a large composite sheet is described.

5 Claims, 8 Drawing Figures

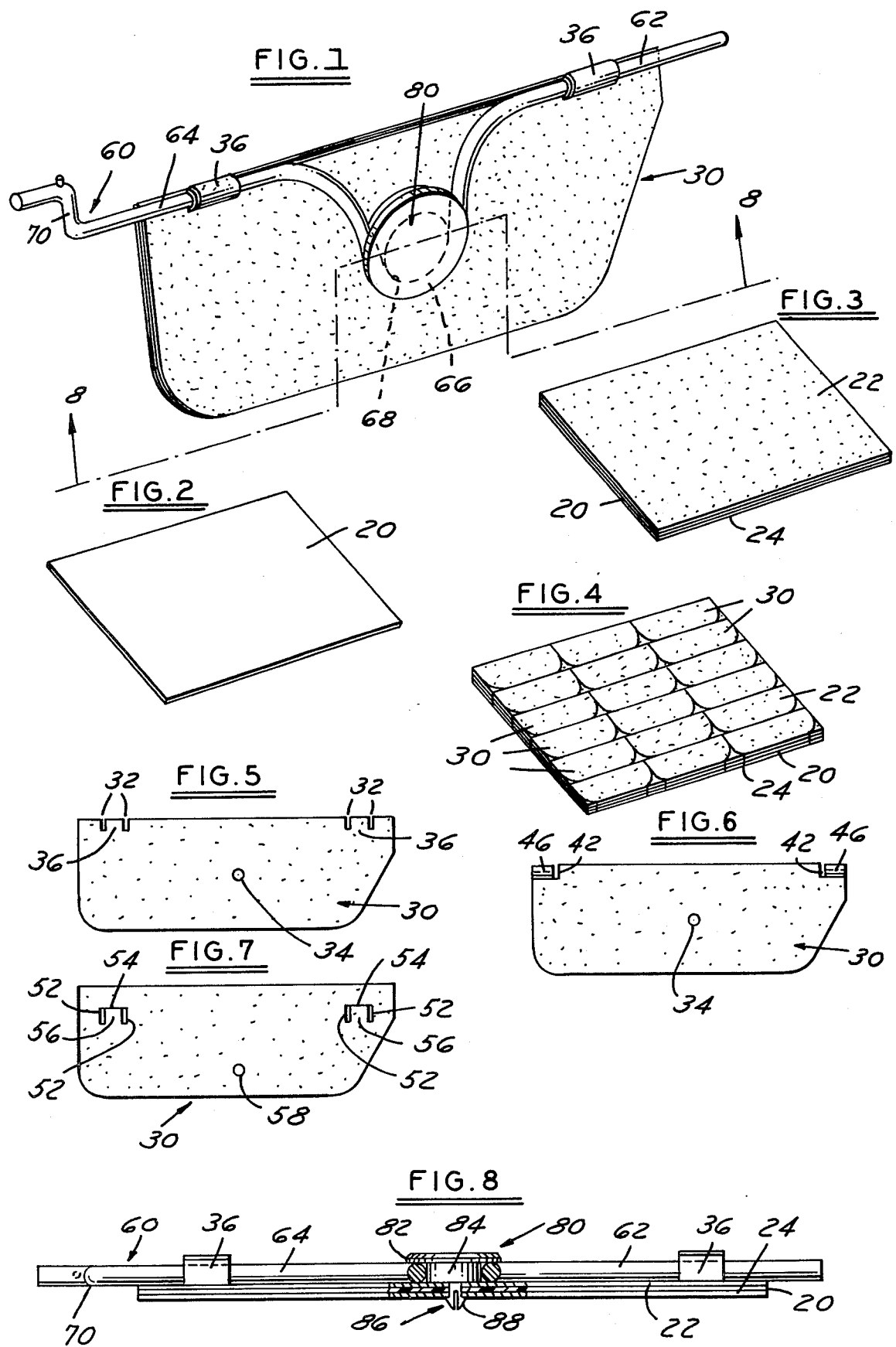

DAMPER DEVICE AND METHOD OF FORMING

FIELD OF INVENTION

Movable dampers or doors for air passages in automotive heaters and air conditioning units, and making and mounting of the same.

BACKGROUND OF THE INVENTION

Small rectangular dampers or doors are used in air passages of automobile heaters and air conditioner units to change the direction of air flow from floor heat to upper vents, from interior air to outside air, to defrost position and the like. These dampers are usually mounted on rods which project from opposite sides to provide pivotal mounting for the dampers.

These damper or door plates have, in recent years, been metal plates covered with a foam plastic sheet on one or both sides to reduce the noise of opening and closing and to provide a built in seal at the edges when the damper is moved from one position to another.

In an effort to reduce the weight in the smaller and lighter cars, there has been a move to plastic panels to be substituted for the base metal substrates. These panels have been molded individually but the molds are expensive and the process time consuming because of the cooling period needed for each plate as it comes from the mold.

Another difficulty with some of these dampers has been the need to apply certain support shafts after positioning the panel in the proper operative location. In some cases, it is necessary to attach the pivot rods after this positioning. This has been done with the application of a self-tapping screw inserted and tightened by one operator. In view of the tight space problems, this assembly is difficult and if done carelessly can lead to great difficulties after a heater is installed in a vehicle. Some snap-in devices requiring lateral pressure on the plate have been proposed but these are also difficult to achieve successfully in the confined space.

The present invention relates to a damper plate and a method of forming and assembly which accomplishes the objective of lighter weight, is adapted to simple multiple production, and is very easily and securely fastened in place.

Briefly, the invention consists of applying the foam sheeting on each side of a large panel sheet of plastic such as a substrate formed of polypropylene, ABS or the like. The sheet is then die cut, using steel rule dies, into a plurality of identical damper panels. Two tab slits are simultaneously cut into the panel at an edge or elsewhere. The tabs are thermoformed to provide snap-in recesses for spaced portions of a shaft, a perforation is provided between and below these recesses, and a button to socket a central loop in the shaft is pressed into the perforation to lock the shaft against movement.

The foam sheeting is compressed as the button is snapped in to provide a resilient and snug fit for the entire assembly.

Thus, a very inexpensive panel is provided with a secure fastening which is easily manipulated by the installer in a simple operation which he can see and feel with assurance of successful contact in each case.

Other objects and features of the invention will be apparent in the following description and claims in which the invention is set forth together with details directed to persons skilled in the art to enable successful practice of the invention, all in connection with the best mode presently contemplated for the invention.

BRIEF DESCRIPTION OF THE DRAWINGS

DRAWINGS accompany the disclosure and the various views thereof may be briefly described as:

FIG. 1, a perspective view of a completed damper device.

FIG. 2, a view of a basic sheet material.

FIG. 3, a view of a coated sheet.

FIG. 4, a view of a sheet cut into blanks.

FIG. 5, a view of an individual damper.

FIG. 6, a view of a modified damper.

FIG. 7, a view showing a damper with formed tabs.

FIG. 8, a sectional view on line 8—8 of FIG. 1.

DESCRIPTION OF THE INVENTION AND THE MANNER AND PROCESS OF USING IT

The invention lies in the design, manufacture and assembly of a door or damper used especially in vehicle heater and air conditioning units. More particularly, it relates to the making of multiple coated dampers from plastic sheet and mounting them in an easily assembled unit which securely attaches the damper to a mounting pivot.

The invention is an improvement in a device wherein a looped cross-axis wire or reel is snapped in a direction parallel to the damper into awaiting recesses at each end and at the loop on the damper. The present assembly utilizes end recesses and a snap-in button which captures the loop of the mounting rod in the X, Y, Z directions and secures the rod in a simple assembly motion.

In FIG. 1, a sheet 20 of plastic material of appropriate thickness is provided formed of a dense plastic such as polypropylene, polycarbonate, nylon, Teflon and the like. The material while somewhat pliable is intended in use to be relatively rigid. This sheet is coated on each side with a foam polyurethane material using a known primer and a suitable adhesive. This is usually a heat lamination in which a primer is applied and then an acrylic adhesive is applied and dried to a tacky condition. The base sheet is then fed into contact with a sheet of foam material in a roll machine and subjected to heat and pressure to complete the lamination. In FIG. 2, the sheet 20 is shown coated on each side with sheets 22 and 24 of polyurethane foam. The total thickness of the composite sheet may be around ⅛ of an inch to 1 inch.

As shown in FIG. 4, the sheet is then die cut into a plurality of parts, eighteen, for example, with the proper shape for the doors 30. The number may depend on the size of the door. This is usually done with dies referred to as "rule" dies formed of steel strip with a proper edge to cut the configuration.

Either during the original die cut or in a separate operation, tab slits 32 are cut into each damper as shown in FIG. 5 and the damper is perforated to provide a receiving port or hole 34 spaced between the slits and a predetermined distance from the mounting axis on which the slits are located. In FIG. 5, the slits are spaced from the ends of the unit to provide tabs 36. In FIG. 6, one slit 42 at the ends forms the tabs 46. In FIG. 7, the slits 52 are spaced inwardly from the top edge and the ends, and a further cross slit 54 will free the tabs 56. The hole 58 is spaced an appropriate distance below the tabs 56.

The tabs 36, 46 and 56 may then be heat formed to curl around as shown best in FIG. 1. The gap between the ends of the tabs and the surface of the damper 30 is slightly smaller than the diameter of a mounting rod 60.

The mounting wire or rod 60 has two straight sections 62, 64 which project from the ends of the damper 30. The intermediate portion between these ends is looped down at 66 to provide a semi-circular recess or bight 68. The left-hand end of section 64 is angled to form a crank section 70 which serves to actuate the damper in its ultimate location in a heater or air conditioner.

The last element of the combination to be described is a button locator 80 having an outer flange 82 (FIG. 1 and FIG. 8), a circular shank 84, and a central prong projection 86 which has a cross slit in a split end, and a barb projection 88, preferably annular.

The diameter of the shank 84 is essentially equal to the diameter of the circular bight 68. The flange 82 is dimensioned larger than the shank to overlie the looped bight 66 as viewed in FIGS. 1 and 8.

In assembly, the ends 62 and 64 can be assembled in suitable bearing journals and then the curved tabs 36 can be snapped over these ends. The sequence of this operation may depend on a particular installation. The loop 66 then lies centered relative to the perforation 34. Next the composite button is thrust into the loop so that the shank interfits with the bight 68 and the prong projection 36 is pushed through the perforation 34. This assembly locks the rod 60 against any movement relative to the damper panel. The loop 66 prevents endwise movement in either direction; it also prevents movement transverse of the panel in a direction toward the tabs 36 and the tabs 36 prevent transverse motion in the other direction. The support rod 60 is securely "locked-in" relative to the damper panel.

It will be seen that the assembly is also very simple and convenient and can be accomplished rather easily even without visual access.

The compression of the polyurethane material covering the core plate 24 takes up any play in the fit between the button and the loop of the rod and acts similarly in the fit of the tabs 36. Thus, a snug fit is assured between the control rod and the damper panel.

What I claim is:

1. A damper plate assembly which comprises:
   (a) a plate shaped to serve as a closure for an opening in an air passage to be pivotally mounted on an axis substantially in the plane of said plate and having longitudinal edges essentially parallel to said axis,
   (b) spaced clips symmetrically disposed on said plate having an opening in one direction toward a common edge of said plate to receive aligned opposite ends of a mounting shaft on said axis,
   (c) a mounting shaft having opposite aligned ends received in and secured by said clips to said plate and formed with a loop overlying said plate, the bight of the loop being spaced laterally on said plate from said clips and said axis, the open side of the loop being open in the direction of said common edge, and
   (d) an insertable button retainer on said plate for said mounting shaft having a head flange to overlie each side run of said loop and a shank to interfit with the bight of said loop between said side runs, said plate having a perforation to receive the shank for holding said button retainer on said plate, said clips and said button cooperating to lock the shaft in three dimensions on said plate against longitudinal and lateral motion on said plate and motion away from the plane of the plate.

2. A damper plate assembly as defined in claim 1 in which said clips are formed adjacent one longitudinal edge of said plate which is parallel to the axis and open in the direction of said edge, and said insertable button is located substantially midway between the longitudinal edges of said plate.

3. A damper plate assembly as defined in claim 1 in which said clips are formed from tabs integral at the base of the tab with said plate and having a portion spaced from said base and extending toward a common edge of said plate.

4. A damper plate assembly as defined in claim 1 in which means is provided to secure the shank of said insertable button to said plate comprising a snap-in projection extending from said shank opposite the head flange and said plate has said perforation to receive said projection to lock said shank on said plate when said projection is pushed into said perforation.

5. A damper plate assembly as defined in claim 4 in which said plate has a foam covering on the side on which said shaft is secured to be compressed by said shaft loop when said snap-in projection is pressed through said perforation.

* * * * *